No. 683,197. Patented Sept. 24, 1901.
J. BRAUN, Dec'd.
J. F. & W. P. M. BRAUN, Executors.
LAWN MOWER.
(Application filed Dec. 5, 1900.)
(No Model.) 2 Sheets—Sheet 1.
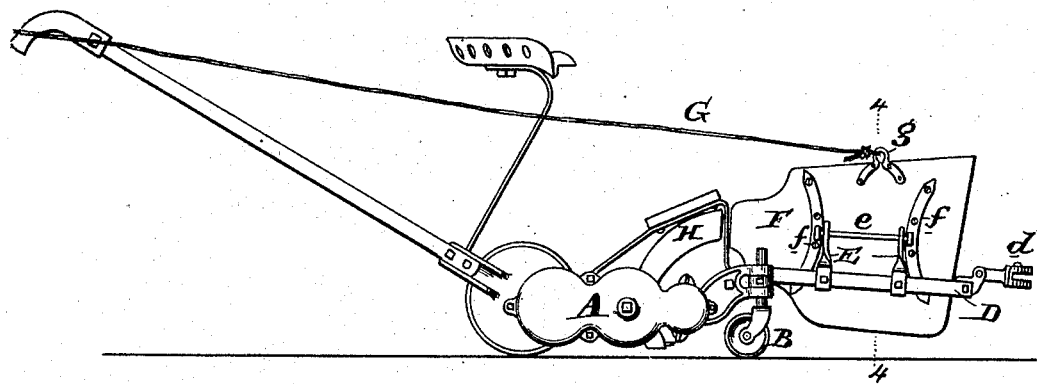
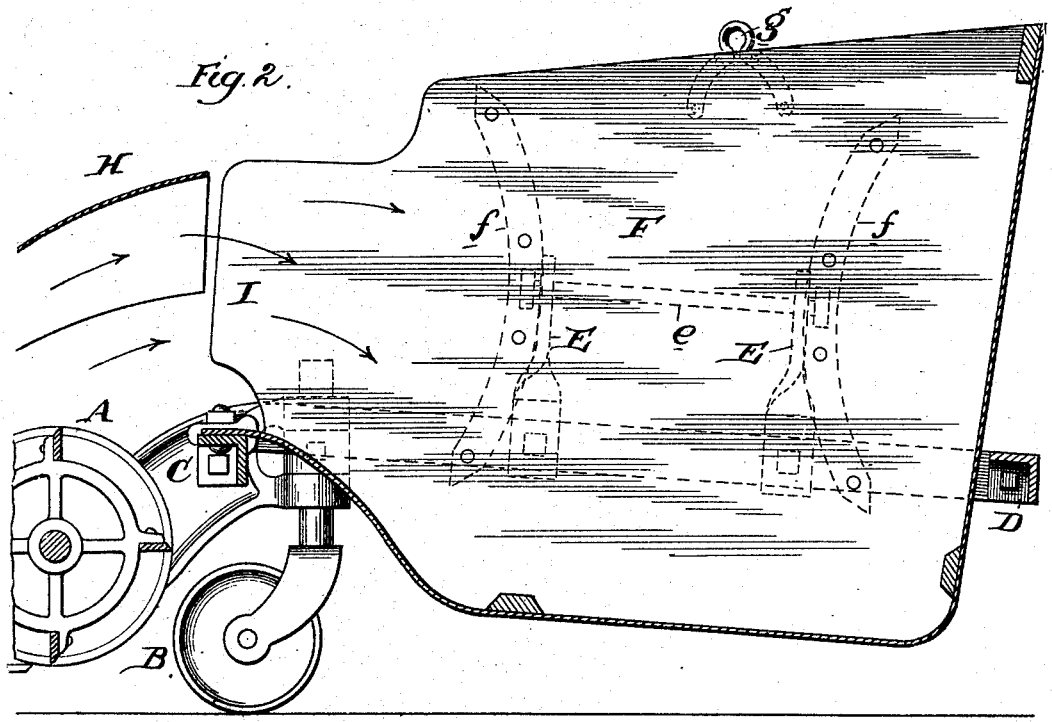
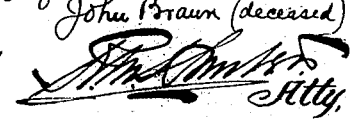

No. 683,197. Patented Sept. 24, 1901.
J. BRAUN, Dec'd.
J. F. & W. P. M. BRAUN, Executors.
LAWN MOWER.
(Application filed Dec. 5, 1900.)
(No Model.) 2 Sheets—Sheet 2.

UNITED STATES PATENT OFFICE.

JOHN F. BRAUN AND WILLIAM P. M. BRAUN, OF PHILADELPHIA, PENNSYLVANIA, EXECUTORS OF JOHN BRAUN, DECEASED.

LAWN-MOWER.

SPECIFICATION forming part of Letters Patent No. 683,197, dated September 24, 1901.

Application filed December 5, 1900. Serial No. 38,717. (No model.)

*To all whom it may concern:*

Be it known that JOHN BRAUN, deceased, formerly of the city and county of Philadelphia, State of Pennsylvania, did invent an Improvement in Lawn-Mowers, of which the following is a specification.

The invention has reference to lawn-mowers; and it consists of the improvements which are fully set forth in the following specification and shown in the accompanying drawings, which form a part thereof.

The object of the invention is to provide a suitable attachment to a power lawn-mower adapted to receive the cut grass and deposit it at intervals out of the path of the machine, the same to be conveniently operated by the driver without leaving his seat.

Heretofore it has been customary to arrange a receptacle to receive the cut grass at the front of the machine and pivoted to the structure of the machine on a transverse axis so as to be capable of being thrown completely over and backward to the rear of the machine. This, however, necessitated the stoppage of the machine in discharging the cut grass and prevented the use of a seat for the driver, making it necessary for him under all conditions to walk. By the present improvements the above objections are overcome, and in carrying out the invention there is arranged on the front portion of the lawn-mower a suitable light framework, having upon each side sockets, and between the said sockets and within the framework is supported a light box-like structure which is provided on each side with longitudinal hinge-rods adapted to socket structures on the projecting framework. In this manner the receptacle may be tilted either to the right or to the left, rocking about either of its longitudinal hinge-rods as an axis and discharging the contents laterally to one side of the machine. The sides and forward and bottom parts of the receptacle are closed, and the rear portion is open and in alinement with the guide for the cut grass. By means of a suitable cord or rope the operator may tilt the receptacle without leaving his seat.

The invention will be better understood by reference to the drawings, in which—

Figure 3:
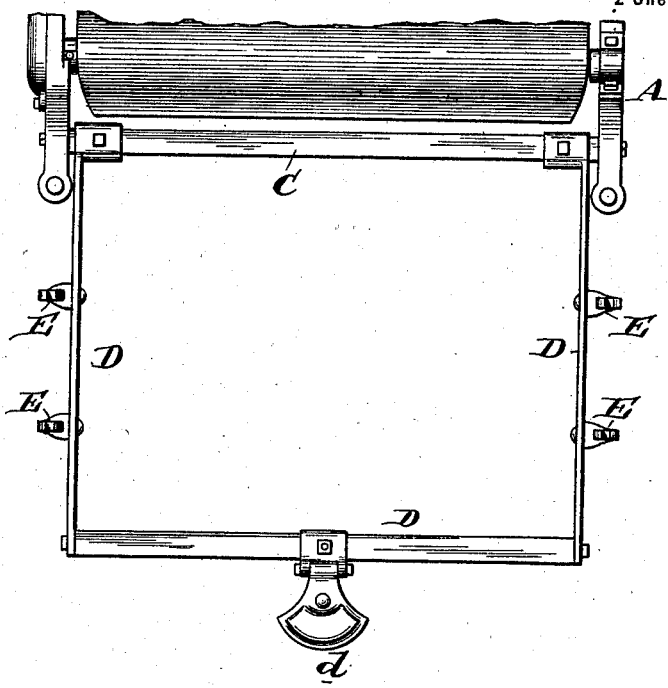
Figure 4:
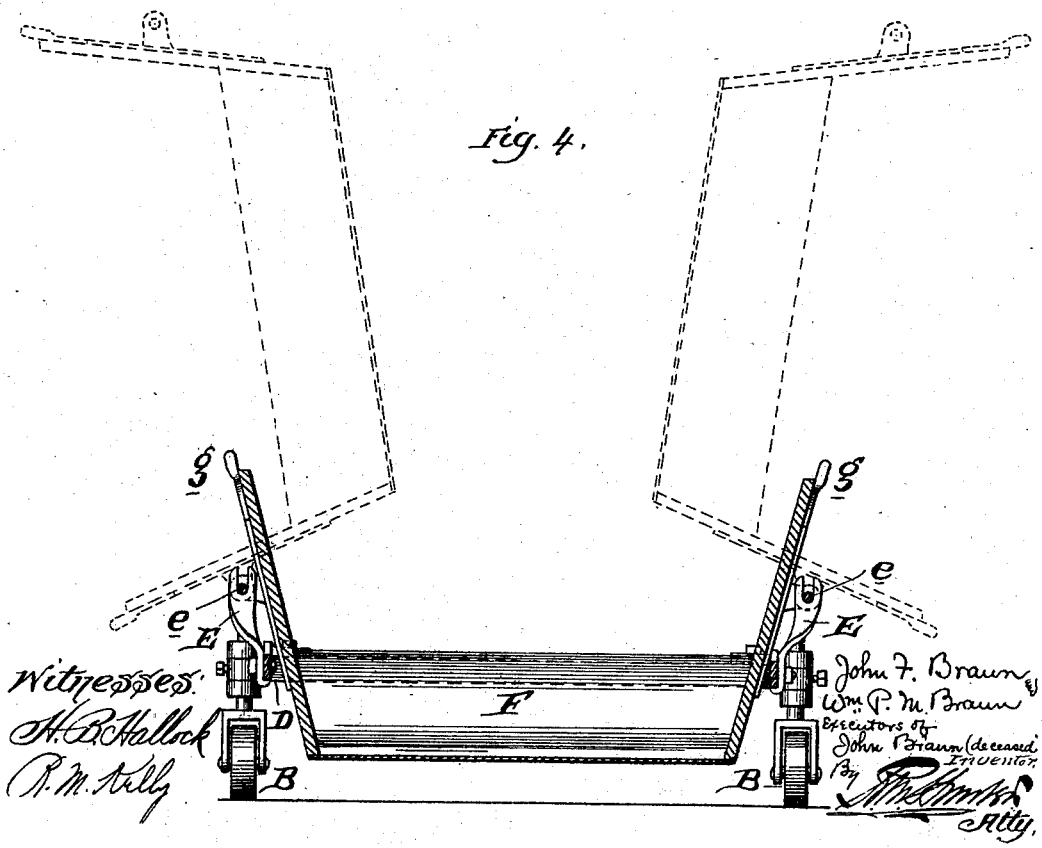

Figure 1 is a side elevation of a lawn-mower embodying the improvements. Fig. 2 is an enlarged sectional elevation of the forward part of same. Fig. 3 is a plan view of the forward part of the lawn-mower with the receptacle removed; and Fig. 4 is a transverse section on line 4 4 of Fig. 1.

A is the lawn-mower proper and may be made of any suitable construction. Usually it comprises a suitable revolving cutter and is sustained upon the main driving-wheels at the rear and guided upon two laterally-disposed caster-wheels B B.

H is a guide for the cut grass, whereby it is thrown upward and forward.

Bolted to the transverse bar C of the lawn-mower is a horizontal U-shaped frame D, said frame being provided with upright socket portions E E upon its lateral or side portions.

F is the receptacle for receiving the cut grass and is so shaped as to substantially fit within the opening formed by the U-shaped frame D and the transverse bar C of the lawn-mower. It is preferred to make this receptacle with wooden sides and a continuous front and bottom of sheet metal, so as to make it exceedingly light and at the same time strong. The side walls of this receptacle are provided with metal brackets *f*, to which are secured longitudinal hinge-rods *e*, said rods being adapted to fit into the sockets E E on the frame D and in that manner support the receptacle F with provision for rocking about the said longitudinal rods *e* either to the right or to the left. As will be seen by examining Figs. 1 and 2, the grass-guide H is so disposed relatively to the receptacle that the cut grass is thrown upward and forward, so as to be deposited within the receptacle F.

*g* designates bails or eyes secured to the sides of the receptacle F, and to either one of these a rope G is secured, which rope may be manipulated by the driver for tilting the receptacle and causing it to rock about the longitudinal rods *e*, as may be determined upon according as to whether the cut grass is to be deposited to the right or to the left during the operation of the machine. Of course it is evident that two ropes may be employed, if desired, but that would not ordinarily be required. It will be observed that by this construction the receptacle F may be readily handled and adapted to quickly discharge its contents out of the path or line of travel of the machine without interference with its operation. The longitudinal rods e also may act as handles in handling the receptacle F when disconnecting or applying it to the machine.

While the machine is shown as a power-machine with provision for attaching the horses to the clevis d, it is to be understood that the improvements may be applied to a hand-machine of smaller size where found desirable. In fact, the machine shown in the drawings is adapted to both power and hand, as desired. It is not, therefore, intended to confine the invention to any particular lawn-mower apparatus proper; but the improvements are intended to be adapted to any lawn-mower now in use.

While the receptacle is shown as detachable from the socket-frame E, so as to be readily removable and also as to have the capacity for being tilted to the right or to the left, it is evident that the inventor may, if desired, confine himself to tilting the receptacle always to the same side, in which case any ordinary hinge may be substituted for the particular manner of hinging the receptacle shown.

While the construction shown is the one preferred, it is not intended to limit the same to the minor details thereof, as they may be modified in various ways without departing from the principles of the invention.

The invention having now been described, what is claimed as new, and desired to be secured by Letters Patent, is—

The combination of a lawn-mower, with a forwardly projecting and overhanging frame D rigidly secured thereto so as to move as a unit with the lawn-mower and having its sides provided with upright socket portions E, a receptacle F provided with longitudinal hinge-rods on each side each comprising brackets and a longitudinal rod e, whereby said receptacle may be supported upon said rods in the socket portions E and rocked in either direction.

In testimony of which invention we have hereunto set our hands.

JOHN F. BRAUN,
WM. P. M. BRAUN,
*Executors of the estate of John Braun, deceased.*

Witnesses:
　ALBERT E. MILLER,
　JESSE GILBERT.